United States Patent [19]
Livingston

[11] 3,738,430
[45] June 12, 1973

[54] SYSTEM AND METHOD OF FLUID FLOW CONTROL UTILIZING A DYNAMIC SHUTOFF VALVE

[75] Inventor: William L. Livingston, Sharon, Mass.

[73] Assignee: Factory Mutual Research Corporation, Boston-Providence Turnpike, Mass.

[22] Filed: Sept. 14, 1971

[21] Appl. No.: 180,332

Related U.S. Application Data

[62] Division of Ser. No. 848,986, Aug. 11, 1969, Pat. No. 3,643,912.

[52] U.S. Cl............... 169/13, 169/16, 169/20
[51] Int. Cl.............................. A62c 35/00
[58] Field of Search............... 169/1, 5, 13, 16, 169/18, 19, 20; 251/5

[56] References Cited
UNITED STATES PATENTS

| 2,265,810 | 12/1941 | Lowe et al. | 160/20 X |
| 2,590,215 | 3/1952 | Sausa | 251/5 X |
| 3,294,105 | 12/1966 | Schaub | 169/13 X |

Primary Examiner—M. Henson Wood, Jr.
Assistant Examiner—John J. Love
Attorney—Joseph M. Lane, Richard L. Aitken, Donald R. Dunner et al.

[57] ABSTRACT

A system and method for fluid flow control in which a valve located in a main supply conduit for the fluid is biased open to permit fluid flow through the conduit. An actuator moves the valve to and maintains it in a closed position in response to a continuous dynamic energy input, the cessation of which permits the valve to move to its normal open position.

10 Claims, 4 Drawing Figures

PATENTED JUN 12 1973　3,738,430

SYSTEM AND METHOD OF FLUID FLOW CONTROL UTILIZING A DYNAMIC SHUTOFF VALVE

CROSS-REFERENCE TO RELATED APPLICATION

This application is a division of applicant's patent application, Ser. No. 848,986, filed Aug. 11, 1969, now U.S. Pat. No. 3,643,912.

BACKGROUND OF THE INVENTION

This invention relates to a system and method of fluid control utilizing a dynamic shutoff valve, and more particularly, to such a system and method in which a main supply conduit supplies a fluid to a system of branch lines, each in turn having its own independently controlled, normally closed valve for directing the fluid to its point of use.

In fixed fire extinguishing systems of the type in which water or other suitable extinguishant is discharged through sprinkler heads located throughout a building or other space to be protected automatically in response to thermo-actuation of one or more sprinkler heads, it is conventional practice to provide a main or system shutoff valve in the conduit connecting the system to a municipal or other water main. Shutoff valves of this type are necessary for such servicing operations to the system as the replacement of sprinkler heads, repairing leaks, and otherwise maintaining the system in operative condition. While many diverse types of commercially available valves are admirably suited to their intended function of shutting off the system from the water supply main, all such valves pose serious problems to the passage of water or other extinguishant to the point where it is needed (i.e., the sprinkler heads) upon the existence of a fire.

Comprehensive studies conducted recently have shown that a common source of failure in automatic fire extinguishing systems of the type used to protect buildings and their contents, is that the main shutoff valve was inadvertently left closed, thereby disabling the system from its intended function. While rigorous inspection programs provide a partial answer to the problem, the normally dormant or inactive condition of a fire extinguishing system invites a maintenance approach in which the repair of a troublesome leak is more readily put off to a future time by closing the main shutoff valve until time can be found to make the repairs. Though obviously, such an approach is diametrically opposed to the basic purpose of the fire extinguishing system, it nevertheless prevails among the maintenance staffs of numerous buildings and is one of the principal current causes of property loss by fire.

SUMMARY OF THE PRESENT INVENTION

In accordance with the present invention, a system and method are provided which include a shutoff valve and an actuating arrangement for the valve which requires an energy input not only to move the valve to its closed position and to maintain it there, but which will also effect movement of the valve to its open position upon termination of the actuating energy input. More specifically, the valve structure involves a diaphragm-like closing member normally biased to its open position and closable by fluid pressure developed by a pump which will maintain closing pressures only when actuated. Preferably, a large capacity, "leaky," rotary vane pump equipped with a hand crank is used to develop the closing control fluid pressure. Also, it is preferred that the control fluid be the line fluid or water tapped from the main, upstream from the shutoff valve, so that line pressure augments the capacity of the pump.

Among the principal objects of the present invention are therefore: the provision of a fluid control system and method of the type referred to, which requires a continuous energy input to maintain a valve in a closed position and in a manner such that termination of the energy input will restore the valve to its open position automatically; and the provision of such a system and method for fire extinguishing systems which requires a continuous positive action on the part of an attendant to maintain the valve in a closed position, thereby insuring the valve moving to an open position upon cessation of such action. Other objects and further scope of applicability of the present invention will become apparent from the detailed description to follow taken in conjunction with the accompanying drawings.

DETAILED DESCRIPTION OF THE PREFERRED EMBODIMENTS

Figure 1:
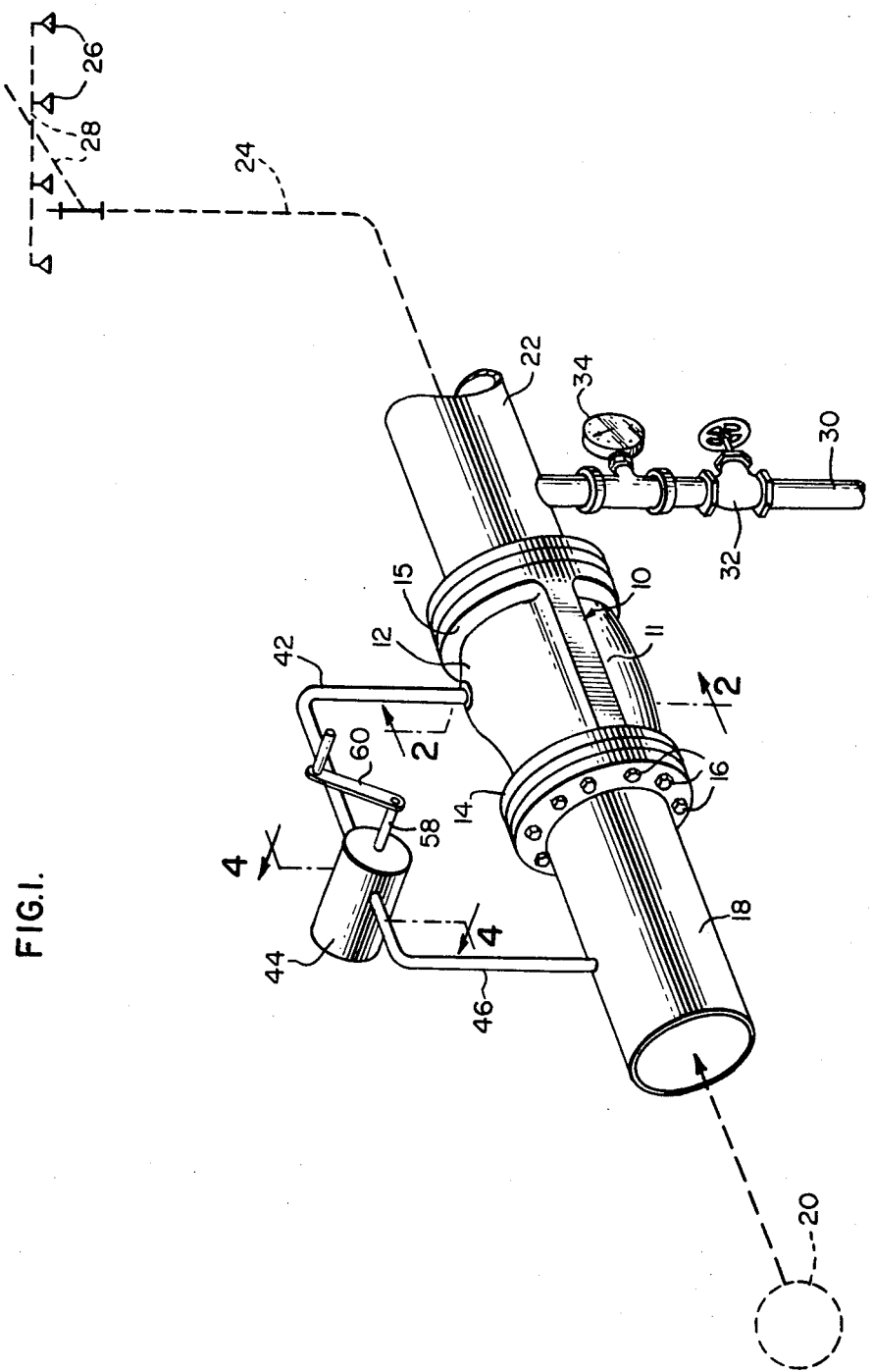
FIG. 1 is a perspective view of the shutoff valve utilized in the system and method of the present invention with the related components of a fire extinguishing system shown in phantom lines.

As shown in FIG. 1 of the drawings, the dynamic shutoff valve utilized in the system and method of this invention is generally designated by the reference numeral 10 and includes a generally cylindrical body or housing 11 having an enlarged central portion 12 and a pair of connecting flanges 14 and 15 on opposite ends. The valve is adapted to be connected at its inlet end 14 by flange bolts 16 to a feed conduit 18 in turn coupled to a water main 20. The outlet end 15 of the valve is similarly connected to a discharge conduit 22 connected to a riser 24 extending to sprinkler heads 26 by way of branch lines 28. It will be appreciated therefore, that the portion of of the system shown in FIG. 1 by phantom lines, namely, the riser 24, sprinkler heads 26 and the branch lines 28 form part of a conventional fire extinguishing system, the sprinkler heads 26 carrying thermally actuated means to effect automatic disbursement of water from the sprinkler heads upon the existence of fire temperatures in their immediate vicinity. Since this portion is exposed to line pressure from the main 20, it is apparent that before such maintenance operations as the replacement of faulty sprinkler heads, repair of leaks in the riser 24 or in the branch lines 28 can be accomplished, it is necessary that the valve 10 be closed to isolate the system from the main 20. Since it may also be necessary to remove water existing in the system before such repairs are made, a drain 30 is provided in the conduit 22, downstream from the valve 10 and fitted with a manually operated globe valve 32. A pressure gauge 34 is positioned ahead of the globe valve 32 in the drain line 30 to indicate line pressure in the fire extinguishing system and also to indicate the open or closed position of the main valve 10 in a manner that will be described in more detail below.

Figure 2:
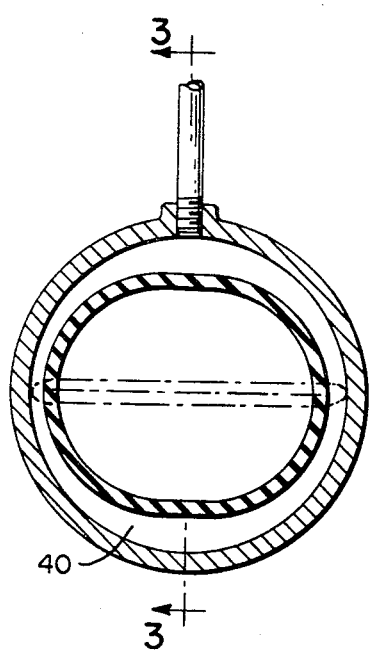
FIG. 2 is an enlarged cross-section taken on line 2—2 of FIG. 1.
Figure 3:
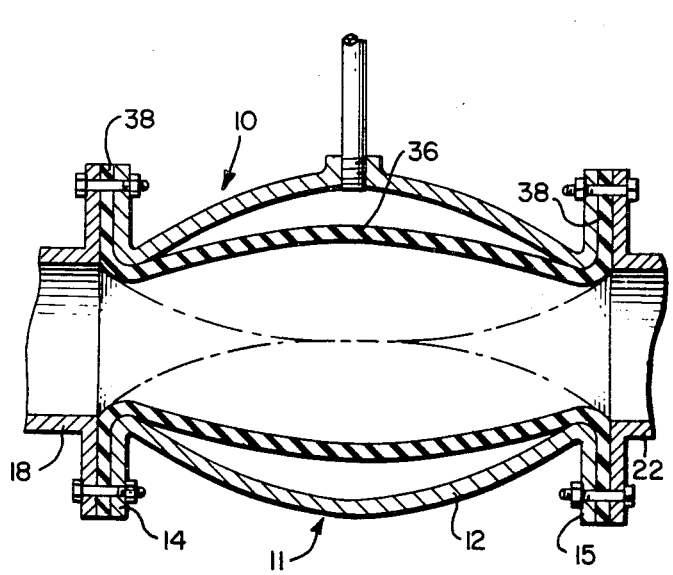
FIG. 3 is a cross-section taken on line 3—3 of FIG. 2.

As shown most clearly in FIGS. 2 and 3 of the drawings, the valve 10 includes an interior diaphram-like member in the form of a tubular boot 36 of rubber or other elastomeric material having outwardly flaired flange portions 38 to be secured between the respective inlet and outlet flanges 14 and 15 on the valve housing 11 and the flanges on the conduits 18 and 22. The boot 36 is relatively thick and normally maintains a generally concentric position within the housing as shown in solid lines in FIGS. 2 and 3. In this position, it will be noted that the boot 36 defines with the central portion 12 of the housing 11 a sealed annular expansible chamber 40 extending over the major portion of the length of the boot. Hence, it will be appreciated when the pressure in the annular chamber 40 exceeds the line pressure or that existing within the boot, the latter will collapse to the position illustrated in phantom lines 2 and 3 and shut off communication between the conduits 18 and 22.

To effect movement of the valve between its open and closed positions as described above, the chamber 40 is in communication through a line 42 with the outlet of a large capacity rotary vane pump 44, the inlet of which is connected to the line 18, upstream from the valve 10, by a tap line 46. Hence, when the pump is actuated, water in the conduit 18 will be pumped into the chamber 40, causing the boot 36 to move from its open position as shown in solid lines in FIG. 2 to the closed position as shown in phantom lines therein.

Figure 4:
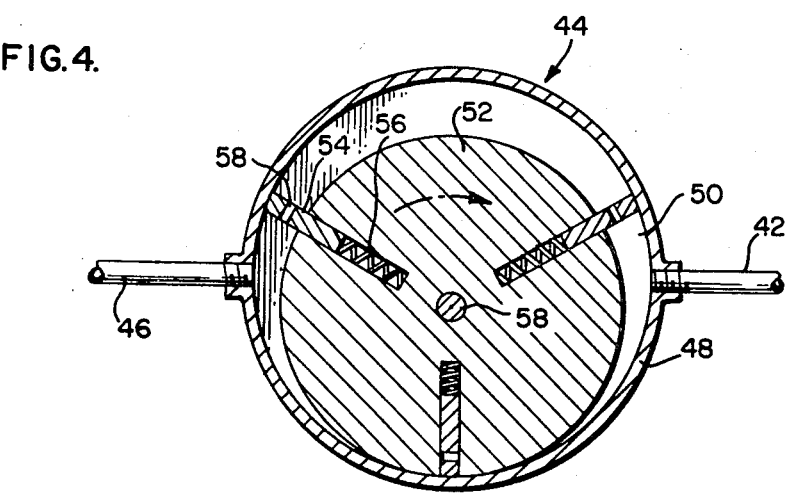
FIG. 4 is an enlarged cross-section taken on line 4—4 of FIG. 1.

The pump 44, as shown in FIGS. 1 and 4, includes a housing or stator 48 shaped interiorly to define a cylindrical chamber 50. Eccentrically mounted within the chamber 50 is a rotor 52 carrying a plurality of slidable vanes 54 biased outwardly by suitable means such as springs 56 into engagement with the interior cylindrical wall surface of the housing 48. The rotor 52 is keyed to a shaft 58 carrying a hand crank 60 which when turned to rotate the rotor in a clockwise direction, as shown in FIG. 4, will operate to pump water from the tap line 46 through the chamber 50 and out through the line 42. As above mentioned, it is preferred that the pump 44 be of relatively large capacity to enable movement of the boot 36 from its open to closed position, and also to maintain it in its closed position, with a reasonable amount of manual effort. An important aspect of the pump capacity in accordance with the present invention, however, is that it must be inherently or otherwise "leaky" so that in the event the motion of the hand crank is terminated, the bias of the boot 36 towards its normally opened position will effect passage of fluid from the chamber 40 back through the pump to the line 18. Although most commercially available pumps of the type having a capacity suited for use with this invention have a sufficient amount of inherent leakage to facilitate such reverse flow of water, it is desirable under certain conditions to augment this inherent leakage by drilling small holes 58 through the vanes 54 of the pump. It will be appreciated that although the holes or ports 58 may be of such small flow capacity that they will not significantly impede the pumping function of the vanes 54, they will permit reverse flow through the pump from the line 42 to the tap line 46 under the pressure exerted by the boot 36 upon restoration to its original or open condition.

In operation, when it is desired to isolate the line pressure in the main 20 and in the conduit 18 from the conduit 22 and the remainder of the fire extinguishing system, it is necessary for an attendant to turn the hand crank and pump water from the upstream side of the valve 10 into the chamber 40 to collapse the boot 36 closing the shutoff valve 10. Moreover, it is necessary for the attendant to continue turning the crank to maintain the valve in its closed position. While the valve is maintained closed, the water downstream from the valve 10 may be drained by opening the globe valve 32 and necessary repairs be made to the fire extinguishing system. When, however, actuation of the pump is terminated, the boot 36 will, of its own resiliency, move to the open position, and in doing so, force water back through the line 42, the pump 44 and into the line 18 thereby reestablishing communication between the main 20 and the sprinkler heads 26.

Thus it will be appreciated that by this invention there is provided a system and method by which the above-mentioned objectives are completely fulfilled. In accordance with the system and method, the fluid flow can be effectively stopped even though the water in the system is dirty and contains particles which could block seating of normal gate valves for example, because of the large seating area and flexibility of the boot 36. More significantly, however, the inherent or internal bias of the boot to an open position insures that it will open without reliance on a single additional functioning part other than the pump which will leak of its own inherent defects to remove the pressure holding the valve closed.

It is contemplated that variations may be made in the disclosed embodiment without departing from the true spirit and scope of the present invention. For example, the hand crank 60 may be replaced by an appropriate power source such as an electric motor supplied by current through a circuit including a switching arrangement requiring continuous attention for operation, it being imperative only that the motor and thus the pump stop operation upon the cessation of such attention. It will be apparent that other such departures from the embodiment disclosed may be made in keeping with the spirit and scope to which the present invention is entitled.

I claim:

1. A fire extinguishing system comprising a conduit for supplying extinguishant from a pressurized source to a distribution system including sprinkler heads for disbursing said extinguishant automatically in response to temperatures existing during a fire, and valve means disposed in said conduit, said valve means comprising a housing having inlet and outlet passages, a valve member disposed within said housing and movable between an open position in which it permits extinguishant flow through said conduit and a closed position in which it prevents extinguishant flow through said conduit, said valve means being continuously biased to one of said positions and being responsive to the presence of pressurized fluid in said housing for moving to the other of said positions, and delivery means to deliver pressurized fluid to said housing to move said valve means to said other position said delivery means having a predetermined fluid leakage requiring a monitored continuous energy input to maintain said valve means in said other position.

2. The system recited in claim 1 wherein said valve means further comprises means defining an expansible chamber to receive pressurized fluid for moving said valve member from said one position to said other position, and wherein said delivery means comprises pump means for delivering pressurized fluid to said chamber to close said valve means in response to said energy input.

3. The system recited in claim 2 wherein said pump means defines a passage for fluids from said chamber when in an inoperative condition.

4. The system recited in claim 2 including conduit means connected between said conduit upstream from said valve means and the inlet of said pump means.

5. The system recited in claim 2 wherein said pump means comprises a stator defining an interior cylindrical chamber having inlet and outlet ports, a rotor mounted eccentrically within said chamber and having movable vanes mounted therein for cooperation with said cylindrical chamber to pump fluid between said inlet and outlet when said rotor is rotated, and means for rotating said rotor in response to said energy input.

6. The system recited in claim 5 wherein said vanes have openings passing therethrough to insure reverse flow of said fluid through said pump means when said rotor is stationary.

7. The system recited in claim 5 wherein said means to rotate said rotor includes a hand crank to receive said energy input.

8. The system recited in claim 1 wherein said valve member is in the form of a tubular boot defining a passage between said inlet and outlet passages of said housing, said boot being formed of elastomeric material and positioned within said housing so that the exterior thereof forms a sealed chamber with said housing, and wherein said delivery means includes means to pressurize said chamber in response to said energy input so that said boot collapses on itself to establish said closed position.

9. The system recited in claim 8 wherein said delivery means comprises a large capacity, rotary vane-type pump having inherent leakage whereby operation of said pump in response to said energy input will readily collapse said boot and maintain said boot in said closed position but pass fluid from said expansible chamber upon cessation of said energy input.

10. The system recited in claim 9 wherein said pump includes pumping elements having passages formed therein to insure reverse flow of fluid from said expansible chamber back through said pump upon cessation of said energy input.

* * * * *